(12) United States Patent
Liu et al.

US008703009B2

(10) Patent No.: US 8,703,009 B2
(45) Date of Patent: Apr. 22, 2014

(54) HIGH-DISCHARGE-RATE LITHIUM ION BATTERY

(75) Inventors: Gao Liu, Oakland, CA (US); Vincent S. Battaglia, San Anselmo, CA (US); Honghe Zheng, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 967 days.

(21) Appl. No.: 12/614,195

(22) Filed: Nov. 6, 2009

(65) Prior Publication Data

US 2010/0167118 A1 Jul. 1, 2010

Related U.S. Application Data

(63) Continuation-in-part of application No. PCT/US2008/063101, filed on May 8, 2008.

(60) Provisional application No. 60/916,715, filed on May 8, 2007.

(51) Int. Cl.
*H01M 4/88* (2006.01)
(52) U.S. Cl.
USPC ....... 252/182.1; 252/500; 252/506; 29/623.1; 429/90; 429/144; 429/149; 429/163; 429/231.1; 429/231.95; 429/232; 429/330

(58) Field of Classification Search
USPC ............... 252/182.1, 500, 506; 29/623.1; 429/144, 163, 231.1, 231.8, 231.95, 429/330, 149, 232
See application file for complete search history.

(56) References Cited

U.S. PATENT DOCUMENTS

| | | | |
|---|---|---|---|
| 2004/0202933 A1* | 10/2004 | Yamaki et al. | 429/231.1 |
| 2005/0123827 A1* | 6/2005 | Kang et al. | 429/149 |
| 2006/0204837 A1* | 9/2006 | Kaito et al. | 429/94 |
| 2006/0216604 A1* | 9/2006 | Kawase et al. | 429/231.95 |
| 2007/0065725 A1* | 3/2007 | Inoue et al. | 429/232 |

OTHER PUBLICATIONS

Liu et al., "Effects of Various Conductive Additive and Polymeric Binder Contents on the Performance of a Lithium-Ion Composite Cathode," Journal of the Electrochemical Society, vol. 155, No. 12, pp. A887-A892, (2008).
Liu et al., "Optimization of Acetylene Black Conductive Additive and PVDF Composition for High-Power Rechargeable Lithium-Ion Cells," Journal of the Electrochemical Society, vol. 154, No. 12, pp. A1129-A1134, (2007).

* cited by examiner

*Primary Examiner* — Khan Tuan Nguyen
(74) *Attorney, Agent, or Firm* — Lawrence Berkeley; National Laboratory

(57) ABSTRACT

The present invention provides for a lithium ion battery and process for creating such, comprising higher binder to carbon conductor ratios than presently used in the industry. The battery is characterized by much lower interfacial resistances at the anode and cathode as a result of initially mixing a carbon conductor with a binder, then with the active material. Further improvements in cycleability can also be realized by first mixing the carbon conductor with the active material first and then adding the binder.

6 Claims, 11 Drawing Sheets

1)                                   2)
Potato like graphite anode laminate prepared with different mixing orders 1)                                   2)
MCMB anode laminates prepared with different mixing orders 1)                                   2)
CCP-G8 flake graphite anode laminates prepared with different mixing orders Rate performance of CCP-G8 electrode obtained with different mixing orders Cycling behavior of these full cells for CCP-G8 laminate prepared with different mixing orders in combination with L333 cathode SEM images of L333 cathode laminate prepared with different mixing orders Conductivity of the L333 laminate prepared with different mixing orders Cycling behavior of these full cells with L333 cathode prepared with different mixing orders

HIGH-DISCHARGE-RATE LITHIUM ION BATTERY

CROSS REFERENCE TO RELATED APPLICATIONS

This application is a continuation-in-part of, and claims the benefit of priority to International Application PCT/US2008063101, said application entitled High-Discharge-Rate Lithium Ion Battery, and having international filing date of May 8, 2008, which application in turn claims the benefit of priority to U.S. Provisional Application Ser. No. 60/916,715, filed May 8, 2007, entitled High-Discharge-Rate Lithium Ion Battery, both of which applications are incorporated by reference herein as if fully set forth in their entirety.

STATEMENT OF GOVERNMENTAL SUPPORT

The invention described and claimed herein was made in part utilizing funds supplied by the U.S. Department of Energy (DOE) under Contract No. DE-AC02-05CH11231 between the U.S. Department of Energy and the Regents of the University of California for the management and operation of the Lawrence Berkeley National Laboratory. The U.S. Government has certain rights in this invention.

BACKGROUND OF THE INVENTION

1. Field of the Invention

The present invention generally relates to lithium ion batteries, more specifically to reducing interfacial lamination resistances of the interface between a lithium ion battery's electrode and electrolyte.

2. Description of the Relevant Art

The three primary functional components of a lithium-ion battery are the anode, cathode, and electrolyte, for which a variety of materials may be used. Typically, the anode of a conventional Li-ion cell is made from carbon, the cathode is a metal oxide, and the electrolyte is a lithium salt in an organic solvent. Commercially, the most popular material for the anode is graphite. The cathode is generally one of three materials: a layered oxide, such as lithium cobalt oxide, a phosphate, such as lithium iron phosphate, or a spinel, such as lithium manganese oxide. Both the anode and cathode are materials into which lithium inserts and extracts. The process of lithium moving into the anode or cathode is referred to as insertion, and the reverse process, in which lithium moves out of the anode or cathode is referred to as extraction. When discharging the cell, the lithium is extracted from the anode and inserted into the cathode. When charging the cell, the exact reverse process occurs: lithium is extracted from the cathode and inserted into the anode.

Liquid electrolytes in Li-ion batteries consist of solid lithium-salt electrolytes, such as $LiPF_6$, $LiBF_4$, or $LiClO_4$, and organic solvents, such as ether. Typically, electrolyte is sandwiched between the interface material of the cathode and anode, and a 25 µm thick porous polypropylene separator interspersed within the electrolyte material. A liquid electrolyte conducts Li ions, which act as a carrier between the cathode and the anode when a battery passes an electric current through an external circuit. However, solid electrolytes and organic solvents are easily decomposed on anodes during charging, thus preventing battery activation. Nevertheless, when appropriate organic solvents are used for electrolytes, the electrolytes are decomposed and form a solid electrolyte interface at first charge that is electrically insulating and high Li-ion conducting. The interface prevents decomposition of the electrolyte after the second charge.

Traditional lithium ion batteries are characterized by dramatically lower capacities (in amp-hours) at high discharge rates (e.g. 20 C, where C is the one hour discharge rate). It is believed that the lowered discharge capacities of the prior art would be alleviated by incorporation of higher amounts of acetylene black (which has relatively higher conductivity per particle), and relatively lower amounts of binder material (e.g. PVDF, or polyvinylidene difluoride). These techniques have not resulted in dramatic changes in lithium ion cell performance increases.

Typically, battery discharge rate versus capacity in amp hours is related by the Peukert equation. Peukert's Law, presented by the German scientist W. Peukert in 1897, expresses the capacity of a battery in terms of the rate at which it is discharged. As the rate increases, the battery's capacity decreases, although its actual capacity tends to remain fairly constant.

Peukert's law is $C_p = I^k t$, where:

$C_p$ is the capacity according to Peukert, at a one-ampere discharge rate, expressed in amp-hours (A·h);

I is the discharge current, expressed in amps;

k is a dimensionless Peukert constant; and t is the time of discharge, expressed in hours (h).

Rather than rate batteries by their one hour discharge rate, manufacturers rate the capacity of a battery with reference to a specified discharge time. Therefore, a modified equation should be used:

$$t = \frac{H}{\left(\frac{IH}{C}\right)^k},$$

where H is the hour rating that the battery is specified against and C is the rated capacity at that discharge rate. In this modified equation, $C_p$ no longer appears. In fact, to more closely describe battery performance versus discharge rates, battery curves are commonly provided detailing the amount (depth) of discharge for a given battery versus time with curves depicting different discharge rates. These charts are referred to as rate curves, discharge curves or rate charts.

For an ideal battery, the constant k would equal 1, in which case the actual battery capacity would be independent of the current discharge rate. For a lead-acid battery, the value is typically between 1.1 and 1.3. It should be noted that the Peukert constant varies according to the age of the battery, and generally increases with age.

The Peukert equation becomes a very important issue in an electric vehicle battery where (typically lithium ion) batteries, initially rated at 20 hours, are instead used at much higher rates, typically depleting the batteries on the order of about 1 hour.

What is thus still needed in the lithium ion battery art is a battery exhibiting a capacity at higher discharge rates that is closer to one with a low discharge rate, or alternatively, with a Peukert constant closer to 1.

BRIEF SUMMARY OF THE INVENTION

The present invention provides for a lithium ion battery utilizing porous composite electrodes with improved electronic conductivity. The present invention provides a lithium ion battery comprising: (a) a mixture comprising a carbon conductor, a binder, NMP solvent, and an active material; (b)

a cathode laminate comprising a conductive foil coated by the mixture; (c) an anode laminate comprising a conductive foil coated by the mixture; (d) an electrolyte; and (e) a cell housing; wherein the cathode, anode and electrolyte are assembled into the cell housing with a porous separator disposed between the cathode and anode.

In some embodiments, the carbon conductor is acetylene black, carbon fibers, single wall carbon nanotubes, or multi-wall carbon nanotubes. In some embodiments, the binder is PVDF (polyvinylidene fluoride), PTFE (polytetrafluoro ethylene), or latex. In some embodiments, the active material is a lithium containing compound.

Additionally, the present invention provides for an electrode useful for a lithium ion battery comprising: (a) a mixture comprising a carbon conductor, a binder, NMP, and an active material; and (b) an electrode material coated by the mixture.

The present invention further provides for a first method of fabricating electrodes useful for lithium ion batteries, mixing sequence 1, which comprises: (a) providing a carbon conductor, a binder, NMP, and an active material; (b) combining the carbon conductor, binder and NMP to a create a mixture; (c) adding the active material to the mixture and thoroughly mixing to form a slurry; (d) coating a conductive foil with the slurry to form a laminate; (e) drying the slurry on the conductive foil; and (f) compressing the laminate foil at a process temperature to form the electrode.

In another embodiment, the present invention provides for a second method of fabricating electrodes useful for lithium ion batteries, mixing sequence 2, wherein the order of adding the binder and active material are reversed, which sequence comprises: (a) providing a carbon conductor, a binder, NMP and active material; (b) combing the carbon conductor, NMP and active material (c) adding the binder material to the mixture and mixing to form a slurry, (d) coating a conductive foil with the slurry to form a laminate; (e) drying the slurry on the conductive foil; and (f) compressing the laminate foil at a process temperature to form the electrode.

By way of this invention, in another embodiment it has been found that by increasing the amount of binder in the slurry composition relative to the conductive carbon, performance is actually increased. It has also been found that by changing the mixing sequence whereby the binder is added after incorporation of the active material, cell cycleability is significantly improved.

The present invention also provides for fabrication of a lithium battery using the fabricated electrodes comprising: (a) providing two fabricated electrodes; (b) providing an electrolyte; (c) providing a porous separator; (d) providing a cell housing; and (e) assembling the two electrodes and electrolyte into the cell housing with the porous separator disposed between the electrodes.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1:
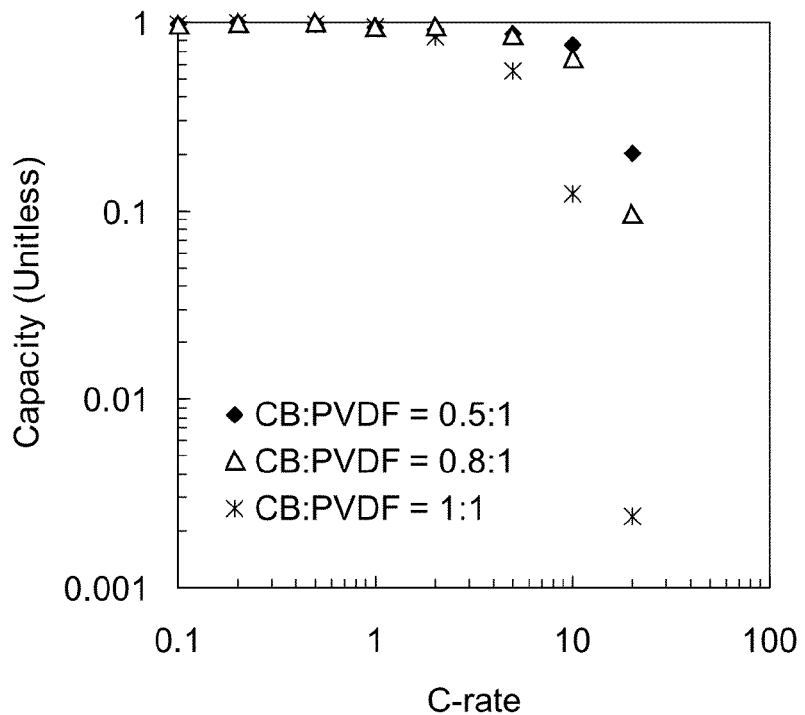
FIG. 1 is a graph depicting experimental results of the reduction in battery capacity versus discharge rate for a coin cell made from a cathode electrode wherein the active ingredient is $LiNi_{0.8}CO_{0.15}Al_{0.05}O_2$, for three different weight ratios of interface conductor (here acetylene black) versus binder (here "PVDF"), the cell including a lithium counter electrode.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "an electrode" includes a plurality of such electrodes, and so forth.

These and other objects, advantages, and features of the invention will become apparent to those persons skilled in the art upon reading the details of the invention as more fully described below.

DEFINITIONS

"Carbon conductor" in this context means any suitable conductive carbon source. Examples include, but are not limited to, acetylene black, carbon fibers, or carbon nanotubes (single or multi-wall).

"Active material" means that portion of the electrode that stores lithium ions. In the case of the cathode, the active material can be a lithium-containing compound such as a lithium metal oxide complex. In the case of the counter, anode electrode the active material can be lithium metal or a form of graphite.

"Binder" means a polymer material compatible with the active material, with an electrical conductivity several orders of magnitude less than the carbon conductor. Examples of the binder include, but are not limited to, PVDF, PTFE, and latex.

"CB" (alternatively "AB") means acetylene black. Acetylene black is a special type of carbon black formed by an exothermic decomposition of acetylene. It is characterized by the highest degree of aggregation and crystalline orientation when compared with all types of carbon black.

"Electrode" means the composite laminate structure comprising a mixture of active material, carbon conductor, and binder deposited upon a conductive foil.

"PVDF" means polyvinylidene fluoride, which has a melting point of about 171.1° C.

"PTFE" means poly(tetrafluoroethene) or poly(tetrafluoroethylene). It is more commonly known as Teflon.

"NMP" means N-methyl-2-pyrrolidone, which may be obtained from the Aldrich Chemical Company, USA.

Introduction

Lithium ion rechargeable batteries are a prime candidate for electric vehicle and hybrid electric vehicle applications due to their high energy capacity and light weight. These applications, especially hybrid electric vehicle application, require low internal impedance for superb high rate charge and discharge performance. The present invention focuses on improving the electronic conductivity of the porous composite electrodes of the lithium ion cells to provide much lower interfacial resistances at the anode and cathode with the electrolyte.

Reducing the interfacial resistance is accomplished by a novel method of fabricating electrodes which feature a carbon conductor, a binder, NMP, and an active material coated onto a conductive foil.

Lithium Ion Battery

The present invention provides for a lithium ion battery utilizing porous composite electrodes with improved electronic conductivity. Specifically, the present invention provides a lithium ion battery comprising: a) a mixture comprising a carbon conductor, a binder, NMP, and an active material; b) a cathode conductive foil coated by the mixture; c) an anode conductive foil coated by the mixture; d) an electrolyte; and e) a cell housing; wherein the cathode, anode and electrolyte are assembled into the cell housing with a porous separator disposed between the cathode and anode.

In some embodiments, the mixture has a weight ratio of carbon conductor to binder of less than 1:1, less than 0.8:1, less than 0.5:1, less than 0.4 to 1, less than 0.3 to 1, less than 0.2 to 1, about 0.15 to 1 or greater than 0.1 to 1. In one embodiment, the mixture has a weight ratio of carbon conductor to binder of greater than 0.1, but less than 0.4 to 1.

The carbon conductor (i.e. the conductive additive) is a carbon containing compound. In some embodiments, the carbon conductor is one or more of the following: carbon black (CB), acetylene black (AB), carbon fibers, single wall carbon nanotubes, or multiwall carbon nanotubes. Additional non-carbon conductors are also contemplated, where the conductors result in substantially lowered interfacial resistances after the processes described herein.

The polymeric binder will have generic thermoplastic properties. In some embodiments, the binder is one or more of the following: PVDF, PTFE, latex, or the like.

N-methyl-2-pyrrolidone (NMP) is a powerful solvent with broad solubility for resins and high chemical and thermal stability. It is completely soluble with water at all temperatures and is soluble with most organic solvents. When the carbon conductor and binder are mixed with the solvent NMP, it creates a conductive carbon glue (see FIG. 6).

In some embodiments, the active material is a lithium containing compound. Examples of such compounds include but are not limited to, $LiNi_{0.8}CO_{0.15}Al_{0.05}O_2$ or $LiMn_2O_4$, $LiNi_{1/3}CO_{1/3}Mn_{1/3}O_2$, and the like.

In some embodiments, the porous separator is polypropylene or any other suitable material of a predetermined thickness. For example, in some embodiments, the porous polypropylene separator is 25 µm thick.

One benefit of a lithium ion battery is that the cell housing can be molded into any shape. Thus, in some embodiments, the cell housing can be in the form of is a pouch, in the form of a coin cell, or a more traditional cylindrical battery shape.

The electrolyte may be any suitable substance containing free ions that behaves as an electrically conductive medium. Liquid electrolytes in Li-ion batteries consist of solid lithium-salt electrolytes, such as $LiPF_6$, $LiBF_4$, or $LiClO_4$, and organic solvents, such as ether. A liquid electrolyte conducts Li ions, which act as a carrier between the cathode and the anode when a battery passes an electric current through an external circuit.

Carbon Conductor: Binder Electrodes

The present invention further provides for electrodes useful for a lithium ion battery comprising a) a mixture comprising a carbon conductor, a binder, NMP, and an active material, and b) an electrode conductive material coated by the mixture.

The electrode conductive material which serves as a support for the mixture can be any electrode support material suitable for battery use. Typically, the cathode support is an Al foil or sheet, whereas the anode support is a Cu containing foil or sheet. In some embodiments, the electrode support material is Al, Cu, stainless steel, or the like.

The present invention provides for a first and second mixing sequence of fabricating electrodes useful for lithium ion batteries, the first sequence comprising: a) providing a carbon conductor, a binder, NMP, and an active material; b) combining the carbon conductor, binder and NMP to create a mixture; c) adding the active material to the mixture and mixing to form a slurry; d) coating a conductive foil with the slurry to form a laminate; e) drying the slurry coated on the conductive foil; and f) compressing the thus dried laminate foil at a process temperature to form the electrode.

In a second mixing sequence, the order of addition of the binder and the active material is reversed, such that in the second step, the carbon conductor, active material and NMP are first combined to form a slurry and then in the next step, the binder is added and the components thoroughly mixed to a slurry, the remaining steps above described for fabricating the electrodes remaining the same.

Thus, as to order of mixing, the component ingredients are first selected, i.e. the carbon conductor, binder, NMP, and active material, the carbon conductor (CC) and NMP then combined with (as the third component) either the binder or the active material, the selected three components mixed. Once mixing is complete, the fourth component, be it the binder or the active material (depending upon which was selected as the third component in the previous step) is combined and the combination mixed again to form the slurry.

Depending upon the materials and ratios selected, one may utilize the first mixing sequence in the preparation of the electrodes, the second mixing sequence in the preparation of the electrodes, or utilize the first mixing sequence for one of the electrodes and the second sequence for the other electrode. In one embodiment, for example, the first order/sequence of mixing may be used for the fabrication of the anode/counter electrode, the second order/sequence of mixing used for the fabrication of the cathode.

Regarding the ratio of (carbon conductor+binder) to active material, the weight ratios can vary significantly. In one embodiment the (carbon conductor+binder) can range from 1% to up to 30% by weight of the total mixture, the active ingredient comprising the balance of the mix. In other embodiments the weight ratio of (carbon conductor+binder) can vary from 1.2%, 2.8%, 3.2% on the low side to up to 24% to 27% and more on the high side.

In some embodiments, the compression process temperature is greater than 80° C. More specifically, the process temperature may be >80° C., >90° C., >100° C., >110° C., >120° C., >130° C., >140° C., >150° C., >160° C., >170° C., >180° C., >190° C., or >200° C.

The present invention also provides for a method of fabricating lithium ion batteries comprising (a) providing two electrodes fabricated by the process disclosed herein; (b) providing an electrolyte; (c) providing a porous separator; (d) providing a cell housing; and (e) assembling the two electrodes and electrolyte into the cell housing with the porous separator disposed between the two electrodes.

I. Improved Mixing and Calendering Process for Electrodes According to the First Mixing Sequence In one embodiment, the mixing of the binder, and then adding the active material, rather than simultaneously mixing all ingredients has been found to improve the electrode interface. The detailed steps follow below.

Initially, acetylene black is mixed with NMP and PVDF at room temperature to form a macroscopically homogeneous slurry. Afterwards, active material is added, and the mixture again mixed until a macroscopically homogeneous slurry is again formed. It is understood that, although the slurry is macroscopically homogeneous, at the microscopic scale, the mixture is substantially nonhomogeneous. In this form the binder has previously and preferentially bonded to the CB.

The slurry formed above is then coated onto a preferred conductive foil to a thickness of 10-20 μm (microns, or micrometers) to form a laminate. In the case of the cathode, the conductive foil is substantially aluminum. In the case of the anode, the conductive foil is substantially copper. Both the anode and cathodes may be comprised of any suitable metallic conductor having the proper electrochemical properties, all of which are well known in the art. The electrodes may be 10-20 μm thick, or thicker as overall battery design issues dictate. The coated laminate is then dried, preferably in a continuous feed oven at about 120° C.

After drying, the laminate, it is compressed to final porosity of about 30-40%. The compression is typically done with a calendering machine. Important to this method is that the coating is compressed at a processing temperature of 120-130° C. when PVDF is the binder. It was found that lowering the compression processing temperature to 110° C. resulted in excessive voids in the coating. Higher temperatures are possible depending on the binder, but temperatures should be maintained below an oxidation temperature for the coating-electrode system components. Alternatively, such compressive heating could be done in vacuum, or in an inert gas atmosphere.

Previous calendering processes are believed to have been performed at room temperature conditions. Here, the heating of the binder in the coating results in an improved interface material, characterized by lowered resistivity. When different binders, or binder combinations, are used, the coating would still need to be sufficiently heated for the binder to agglomerate to the active particles, and for the carbon conductor to be able to form conductive microstructural chains that result in lowered resistivity over prior processes.

It is clear that a battery constructed using the improved interface electrodes will have lower internal resistance. The lowered internal resistance in turn allows for much higher discharge rates with less loss of battery capacity. Additionally, the lowered internal resistance also allows for much greater recharge rates, as internal heating due to battery internal resistance is reduced. This allows for shorter recharging times.

In the experimental results reported below (especially those of FIGS. 1, 2, 3, and 5) the raw materials as used for the experiments are now described. Battery grade AB with an average particle size of 40 nm and a material density of 1.95 g/cm$^3$ was acquired from Denka Singapore Private Limited. PVDF #1100 binder with a material density of 1.78 g/cm was supplied by Kureha, Japan. Anhydrous N-methylpyrrolidinone (NMP) was purchased from Aldrich Chemical Company. The AB/PVDF mixtures were made by dissolving 5 g of PVDF in 95 g of anhydrous NMP. A given amount of AB was dispersed in the PVDF polymer solution to meet the desired ratio. To ensure the thorough mixing of the AB nanoparticles into the polymer solution, sonification was used. A Branson 450 sonicator equipped with a solid horn was used. The sonication power was set at 70%. A continuous sequence of 10 s pulses followed by a 30 s rests was used. The sonic dispersion process took about 30 minutes. The slurry properties for all AB/PVDF in NMP were constant after 20 minutes of sonification.

Slurries with active cathode material were made by adding the targeted amount of $LiNi_{0.8}CO_{0.15}Al_{0.05}O_2$ active material to into premixed AB/PVDF/NMP slurry. The cathode mixture was homogenized using Polytron PT10-3S Homogenizer at 3000 RPM for 15 minutes until viscous slurry is acquired. $LiNi_{0.8}CO_{0.15}Al_{0.05}O_2$, with a mean particle size of 10 μm and lattice density of 4.73 g/cm3, was a gift from Toda, Japan. The manufacture suggested specific capacity is 173 mAh/g when cycled between 3 V and 4.1 V.

Different weight ratios of AB are dispersed in PVDF-NMP solutions and cast into thin films. The film compositions extend from 0.1:1 to 1:1 AB/PVDF weigh ratios. The films show cracks beyond the AB/PVDF ratio of 1:1, which would indicate that mixtures with less than this fraction of binder may not effectively maintain coherent, long-range conductivity in an electrode. AB/PVDF ratios greater than 1:1 will also likely to result in mechanically weak composites. $LiNi_{0.8}Co_{0.15}Al_{0.05}O_2$ active material was used with the AB/PVDF to fabricate electrodes. The AB content was fixed at 4% by weight in three electrode compositions, but the amount of PVDF binder was varied to achieve AB/PVDF weight ratios of 0.5:1, 0.8:1 and 1:1.

Both AB/PVDF and $AB/PVDF/LiNi_{0.8}Co_{0.15}Al_{0.05}O_2$ films for the four-point probe DC tests were cast on to glass surfaces with a doctor blade. Cathode laminates (AB/PVDF/$LiNi_{0.8}Co_{0.15}Al_{0.05}O_2$) for coin-cell testing was cast on 30 μm thick battery grade Al sheet using a Mitutoyo doctor blade and a Yoshimitsu Seiki vacuum drawdown coater. The films and laminates were first dried under IR lamps for an hour until most of the NMP was evaporated and they appeared dried. The films and laminates were further dried at 120° C., under $10^{-2}$ torr pressure for 24 hours. The film and laminate thickness was measured with a Mitutoyo micrometer with an accuracy of 1 μm. The typical thickness of the AB/PVDF film is around 20 μm with a density of around 1.2 g/cm$^3$. The typical thickness of the $AB/PVDF/LiNi_{0.8}Co_{0.15}Al_{0.05}O_2$ film is approximately 50 μm with an initial porosity around 52%.

The electrodes were compressed to 35% porosity before coin cell assembly using a rolling mill with a continuously adjustable gap from International Rolling Mill. The gap between the rollers was set at the targeted thickness. The electrode laminate was fed through the gap to compress the electrode to the thickness accounted for 35% overall porosity.

Assembly of the coin cells used in the experiments were prepared in standard 2325 coin cell hardware with $LiNi_{0.8}Co_{0.15}Al_{0.05}O_2$ as the active cathode material. The cathode laminates were prepared with different AB/PVDF contents. A 1.26 cm diameter disk was punched out from the cathode laminate for use in the coin cell assembly. Both lithium metal and MCMB10-28 graphite were used as counter electrodes. The counter electrodes are 1.47 cm diameter disks, which are larger than the cathode to prevent lithium deposition at high charge rate.

The cathode electrode was placed in the center of the outer shell of the coin cell assembly and 2 drops of 1 M $LiPF_6$ in EC:DEC (1:1 weight ratio) electrolyte added to fill the electrode. A 2 cm diameter of Celgard 2400 porous polyethylene separator was place on top of the cathode electrode. A few drops the electrolyte were added to the separator. The counter electrode was placed on the top of the separator. Special care was taken to align the counter electrode symmetrically above the cathode. A stainless steel spacer and a Belleville spring were placed on top of the counter electrode. Plastic grommet was placed on top of the outer edge of the electrode assembly and crimped closed with a custom-build hydraulic crimping machine manufactured by National Research Council of Canada. The entire cell fabrication procedure was done in an Argon filled glove box at oxygen level below 0.1 ppm and dew point below −80° C.

The coin cell performance was evaluated in a thermal chamber at 30° C. with a Maccor Battery Test System. The electrode rate performance was characterized against lithium counter electrode and MCMB10-28 counter electrode coin cells. The cycling voltage limits were set at 4.1 V at the top of charge and 3.0 V at the bottom of charge. The coin cells made with MCMB10-28 graphite were first formed by going through 2 cycles at C/25 at 30° C. The EIS tests were performed at 40% depth of discharge (DOD) at frequencies between $10^5$ Hz to 0.01 Hz using a Solartron 1260 Impedance/Gain-phase Analyzer and Z-plot software package. HPPC tests were performed only on the MCMB-based coin cells following the established procedures.

FIG. 1 is a graph depicting experimental results of the reduction in battery capacity versus discharge rate for three different weight ratios of interface conductor (acetylene black "CB") versus binder (PVDF). Here, the same amount of acetylene black conductor is used as an additive for loading in the cathode electrode. The three different plots show the relative capacity reductions versus discharge rate for batteries with increasing non conductive PVDF type binder. The results shown here indicate that high rate performance of the corresponding electrode is significantly improved. Low rate performance appears unaffected by the amount of binder in the range studied.

Interpreting FIG. 1, at a discharge rate of about 20 C, the battery with an interface composition of CB:PVDF of 1:1 has capacity reduced to about 0.002 of the original capacity (a unitless 1). The battery with the CB:PVDF of 0.8:1 has capacity reduced to about 0.08 of the original capacity. Finally, the battery with the CB:PVDF of 0.5:1 has capacity reduced to about 0.2 of the original capacity. Thus, at the 20 C discharge rate, the compositional ratio of CB:PVDF of 0.5:1 appears to have about 100× the capacity of the battery with an interface composition of CB:PVDF of 1:1, illustrating the unexpected improvement in performance realized when using greater amounts of binder relative to CB.

It is believed that this behavior may be attributed to the improved interface electronic conductivity between the active material particles and the acetylene black conductive additives as shown in the impedance study of these electrodes. The interface impedance decreased dramatically with increasing amount of PVDF binder.

Conventional thinking is that when the ratio of non conductive binder is increased, at a given acetylene black concentration, the interface impedance will increase due to the lithium ion blocking effect from the binder. The findings shown here indicate the opposite of conventional thinking. Better integration of the interface between the carbon glue and the active material appears to significantly improve the kinetics of the lithium ion transport at the interface, therefore improving the battery performance at higher discharge rates.

Restating the paragraph above, by increasing the binder weight percent relative to the conductor, interfacial resistance is dramatically decreased. Since this is a major component of battery internal resistance, high currents result in little internal resistance thermal dissipation, increasing effective battery capacity at high discharge rates.

Figure 2:
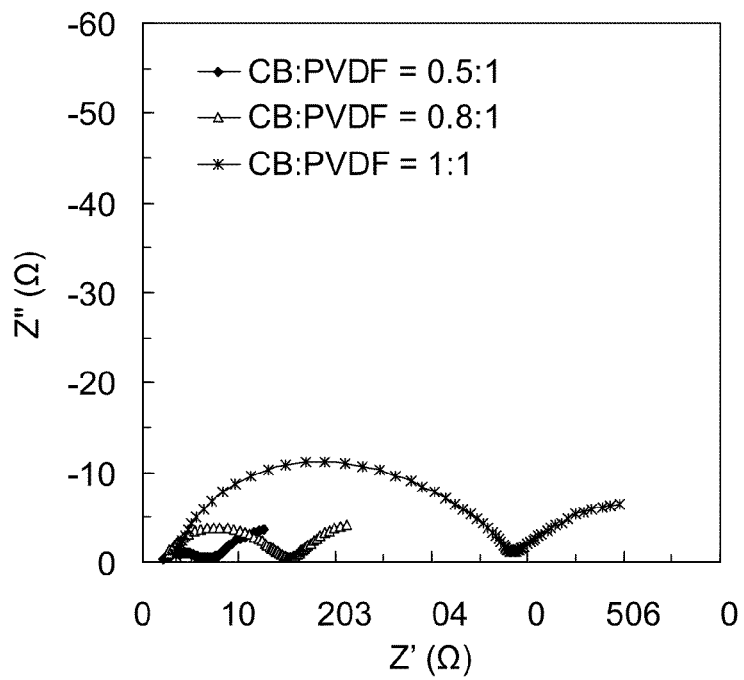
FIG. 2 is a graph depicting experimental results of battery real impedance (labeled Z') versus reactive impedance (labeled Z") for three different weight ratios of interface conductor (here acetylene black) versus binder (here PVDF) for the coin cell used in the reported experiments of FIG. 1.

FIG. 2 is a graph of the real and reactive impedances of batteries with the same compositional ratios as used in FIG. 1. The batteries tested in FIG. 2 are at about 40% depth of discharge. Here, the battery with the CB:PVDF ratio of 1:1 has a maximum real internal resistance of about 50Ω, while the battery with the CB:PVDF ratio of 0.5:1 has a maximum real internal resistance of about 13Ω for a decrease in internal resistance of about a factor of 4 (50/13=3.85). Additionally, due to improved lithium ion transport at the interface, the maximum reactive impedance between the two appears to decrease from about −12Ω to about −4Ω.

Further, as the plots of FIG. 2 appear to decrease in magnitudes of both real and reactive impedances, it is believed that further reductions of internal impedance are possible. It is believed that the CB:PVDF weight ratios can be further reduced to 0.3:1, 0.2:1 and possibly even to 0.15:1 (with improved process controls at the lowest level).

Figure 3:
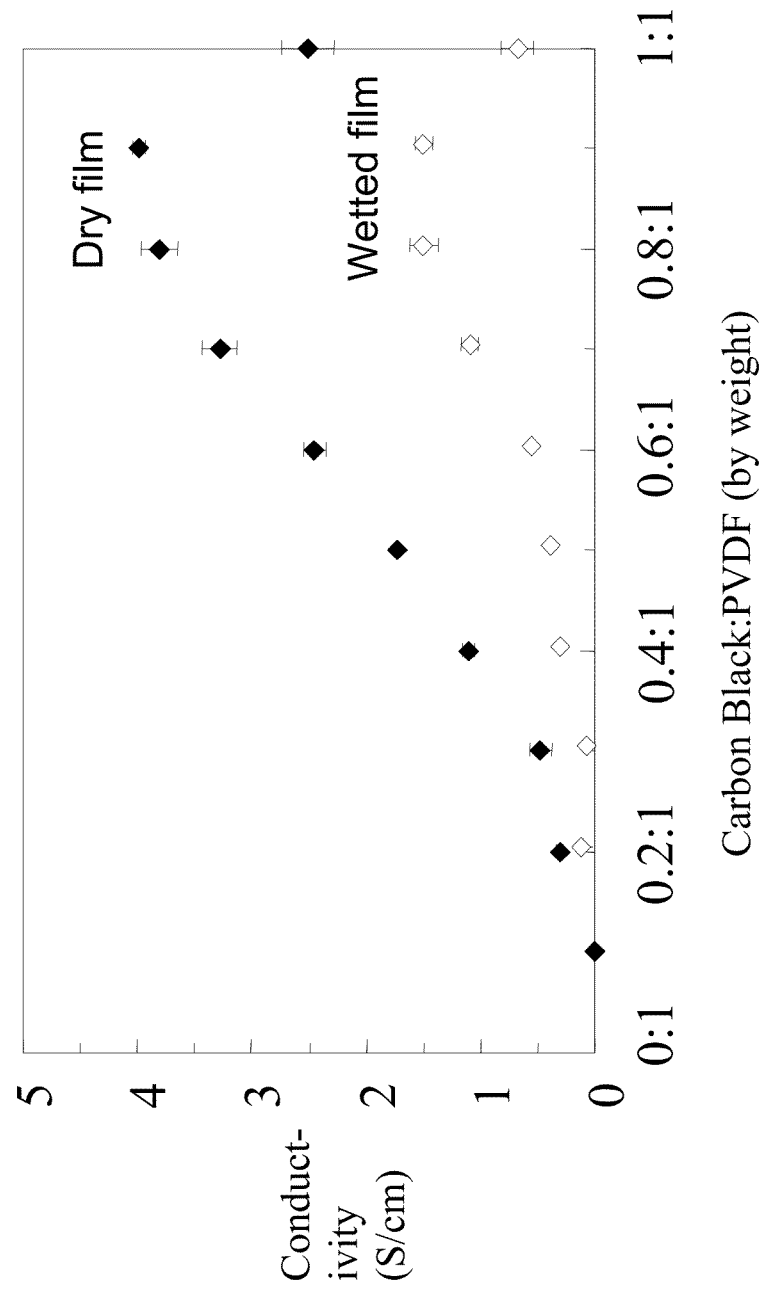
FIG. 3 is a graph depicting conductivity changing with different ratios of acetylene black:PVDF films on glass.

The conductivity of the films was measured using the four probe technique. The dry film conductivity was measured after the film was dried in a vacuum oven. Later, the film was wetted with electrolyte solvent and its conductivity was measured again. FIG. 3 shows the conductivity increasing with the acetylene black ratio and peaks at 0.8:1 acetylene black to PVDF. Further increases in acetylene black content decrease the conductivity significantly. The conductivity of solvent wet films follows the trend of the dry films, but with only a third of the conductivity of the corresponding dry films.

Figure 4A:
FIG. 4, Panel A depicts a cross-sectional image of 0.5:1 acetylene black and PVDF composite film viewed under TEM. Panel B depicts an image showing pure acetylene black powder forms branches. The areas rich in acetylene black are shown in the branched or unbranched black lines. The areas rich in polymer are bounded by the white lines.
Figure 4B:
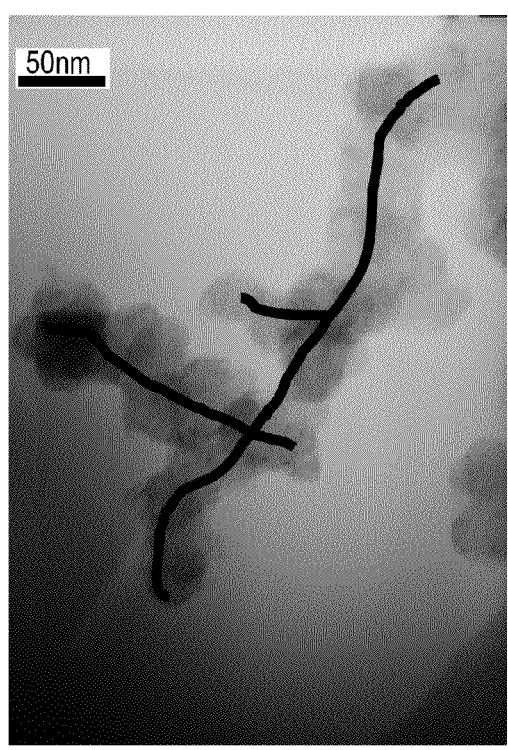

The acetylene black and PVDF composite film is nanoscale inhomogeneous, as show in the Transmission electron microscope (TEM) image of FIG. 4, A. There are two distinct regions, an acetylene black rich region and a polymer rich region. The acetylene black rich region is coated with PVDF polymer providing mechanical integrity. The branch structure of the acetylene black is clearly preserved from the original acetylene black powder. (FIG. 4, B) PVDF coatings integrate these conductive branches to form continuous electronic pathways.

Figure 5:
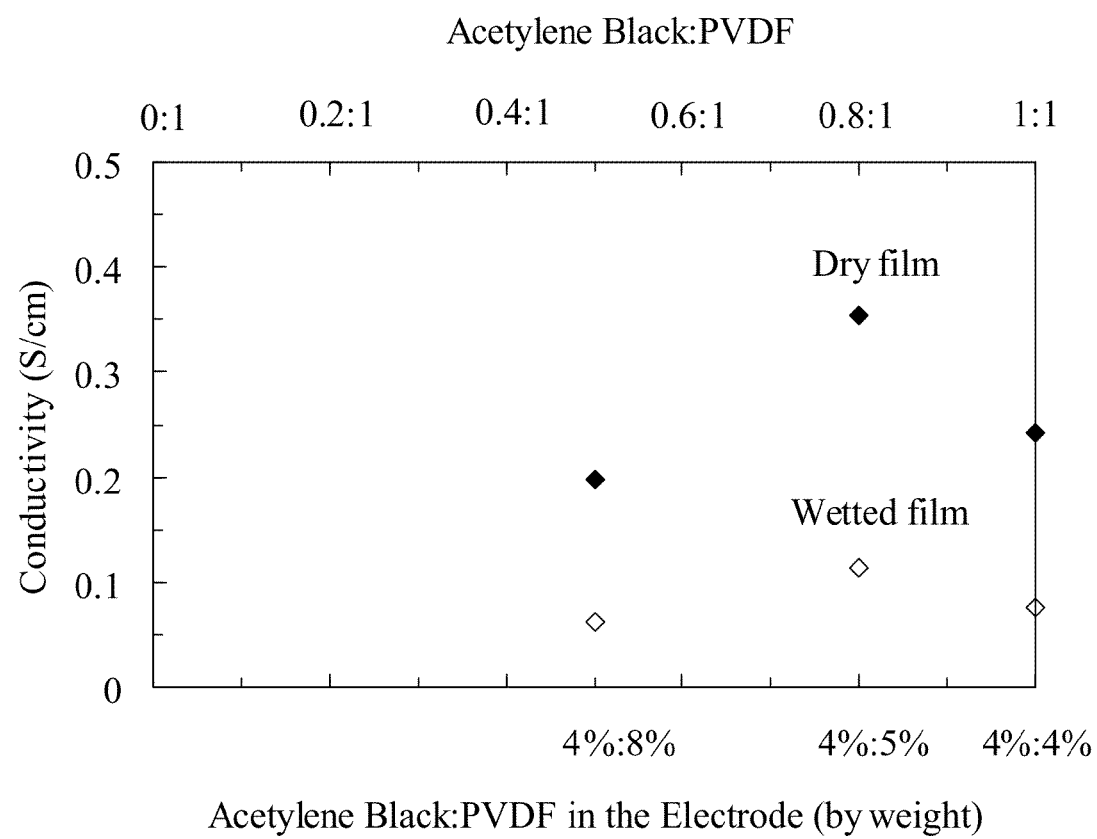
FIG. 5 is a graph showing the conductivity of $LiNi_{0.8}CO_{0.15}Al_{0.05}O_2$ based cathodes at the same 4% acetylene black additive level, with three different amounts of binder.

FIG. 5 shows the actual electrode conductivity made from the conductive glue and active material. In this case, $LiNi_{0.8}CO_{0.15}Al_{0.05}O_2$ was used as active material. The acetylene black content was fixed at 4% by weight in all 3 electrodes, but the amount of PVDF binder was varied to achieve 0.5:1, 0.8:1 and 1:1 acetylene black to PVDF. The conductivity changes according to the binder content at a constant acetylene black level in three electrodes. This trend is in agreement with the conductivity behavior of the PVDF and acetylene black composite thin films as shown in FIG. 3.

Figure 6:
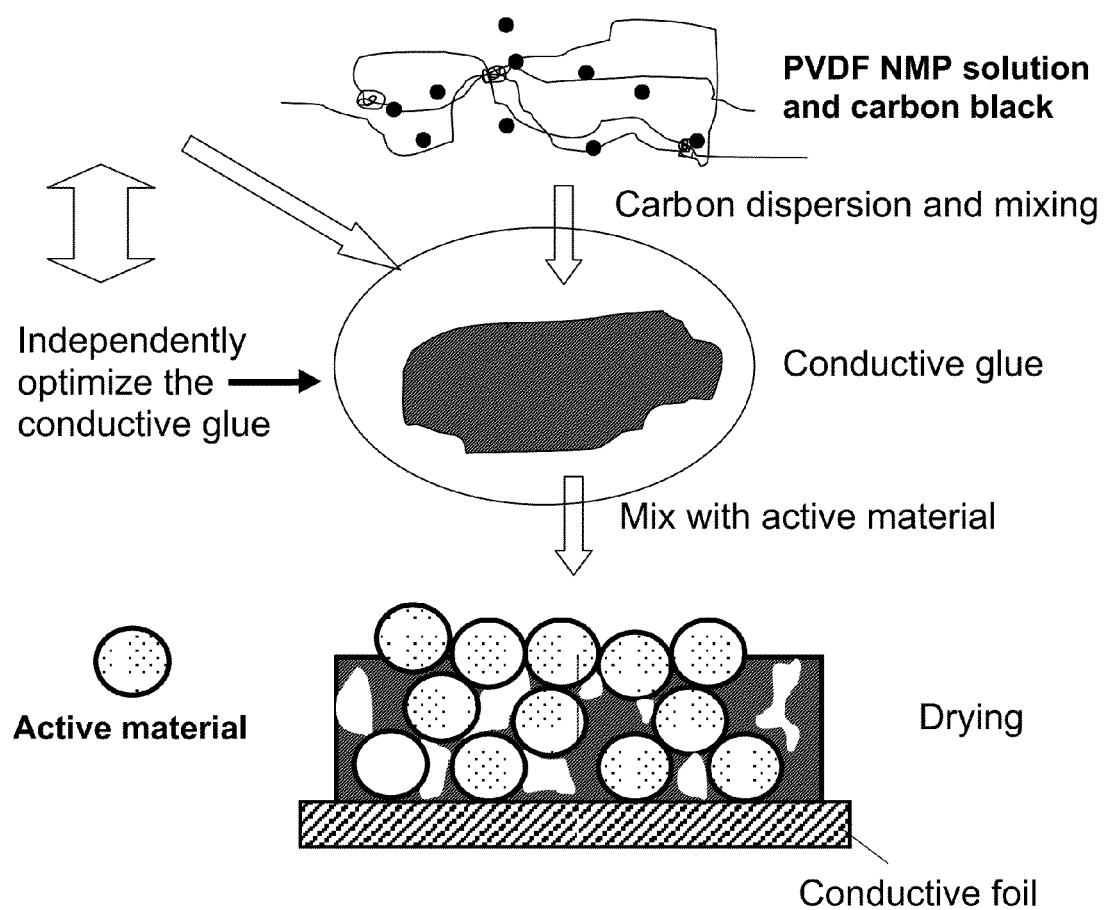
FIG. 6 is a cartoon depicting a flow diagram of how the active material is glued together by conductive glue.
Figure 7A:
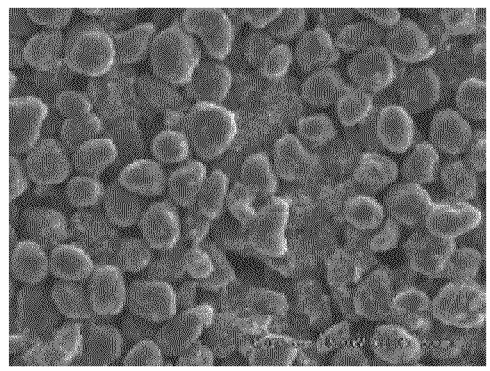
FIG. 7 is a series of SEM images of laminate morphologies of different graphite based anode laminates obtained using slurries of mixing sequences 1 and 2.
Figure 7A:
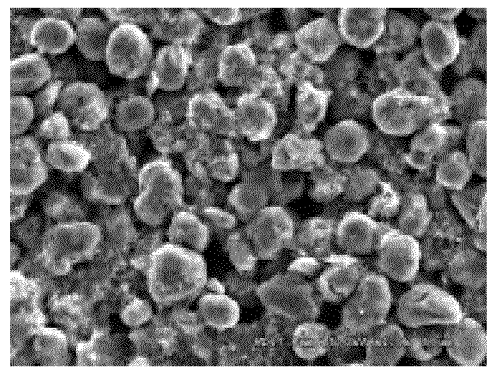
Figure 7B:
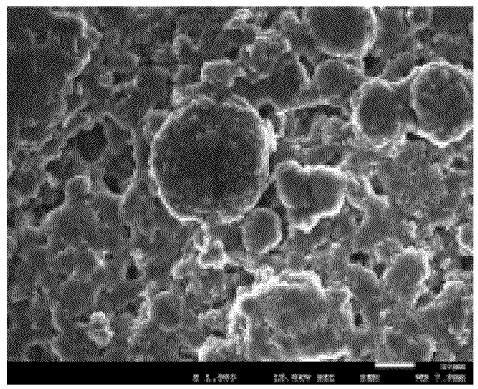
Figure 7B:
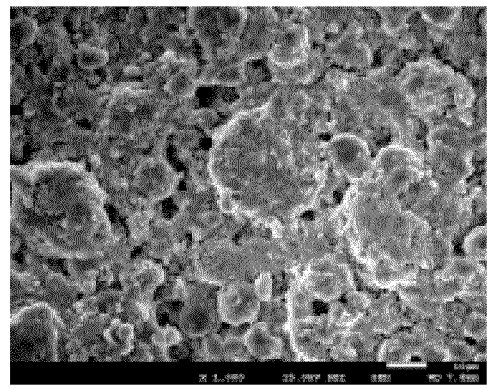
Figure 7C:
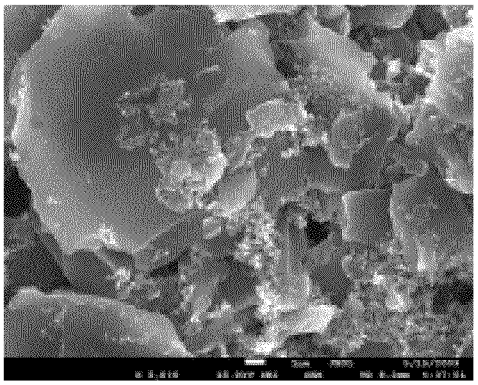
Figure 7C:
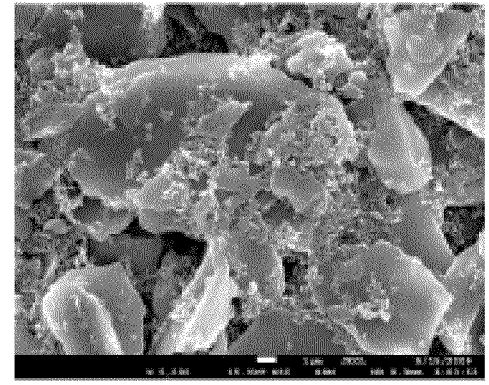

FIG. 6 is a cartoon flow diagram of the mixing order of sequence 1. Herein, the first step of the sequence is to form a conductive glue system containing PVDF and dispersed acetylene black in NMP. The second step of the sequence is to mix an active material into the conductive glue.

For a more complete discussion as to the preparation of these various mixtures, and testing methodologies, reference is made to the articles (1) G. Liu, H. Zheng, S. Kim, Y. Deng, A M. Minor, X. Song, and V. S. Battaglia, Effects of Various Conductive Additive and Polymeric Binder Contents on the Performance of a Lithium-ion Composite Cathode, Journal of the Electrochemical Society, 155 (12) A877-A892, Oct. 6, 2008, and (2) G. Liu, H. Zheng, A. S. Simens, A. M. Minor, X. Song and V. S. Battaglia, Optimization of Acetylene Black Conductive Additive and PVDF Composition for High Power Rechargeable Lithium-Ion Cells, Journal of the Electrochemical Society, 154 (12) A1129-A1134, Oct. 22, 2007. Both of these articles are incorporated herein by reference as if fully set out in their entirety herein.

II. Improved Mixing and Calendaring Process for Electrodes According to the Second Mixing Sequence In addition to the first mixing sequence above described, it has been found that cycleability can be improved by reversing the order of addition of the binder and the active material. Here, in this alternative embodiment, active material and acetylene black are first thoroughly mixed in NMP solvent. In one embodiment the mixing can be done in a homogenizer at 3000 rpm for 10 minutes. Thereafter, appropriate amounts of PVDF are added and the mixture subject to thorough mixing again with the homogenizer at 3000 rpm for 30 minutes. Electrodes and batteries were fabricated according to general procedures well known in the art in connection with the mixing sequence 1. For the reported experiments of FIGS. 7-12, coin cells were fabricated, the fabrication of such cells described hereinabove, and in the two Journal of Electrochemical Society articles above cited at paragraph [0091].

In order to demonstrate the differences in cycleability obtained using the first and second mixing sequences, a comparison was conducted wherein, according to the first sequence, 5 wt % of PVDF in NMP solution is prepared, and an appropriate amount of acetylene black thoroughly mixed for 30 minutes in a sonficator. Active material was then thoroughly mixed in with the glue in a homogenizer at 3000 rpm for 10 minutes. The morphologies for the different graphite laminates (used as the anode) are compared in FIG. 7, wherein (1) is according to the first sequence method, and (2) is according to the second sequence method.

The SEM images of FIG. 7 show the effects of mixing order on the morphologies of graphite laminate, which are most strongly dependant on the shape of the graphite. With potato like graphite, it shows that the second mixing order (2) makes the distribution of acetylene black more uniform and closely contact graphite beads. With MCMB and flake graphite like CCP-G8, no obvious difference in morphology was observed.

Figure 8:
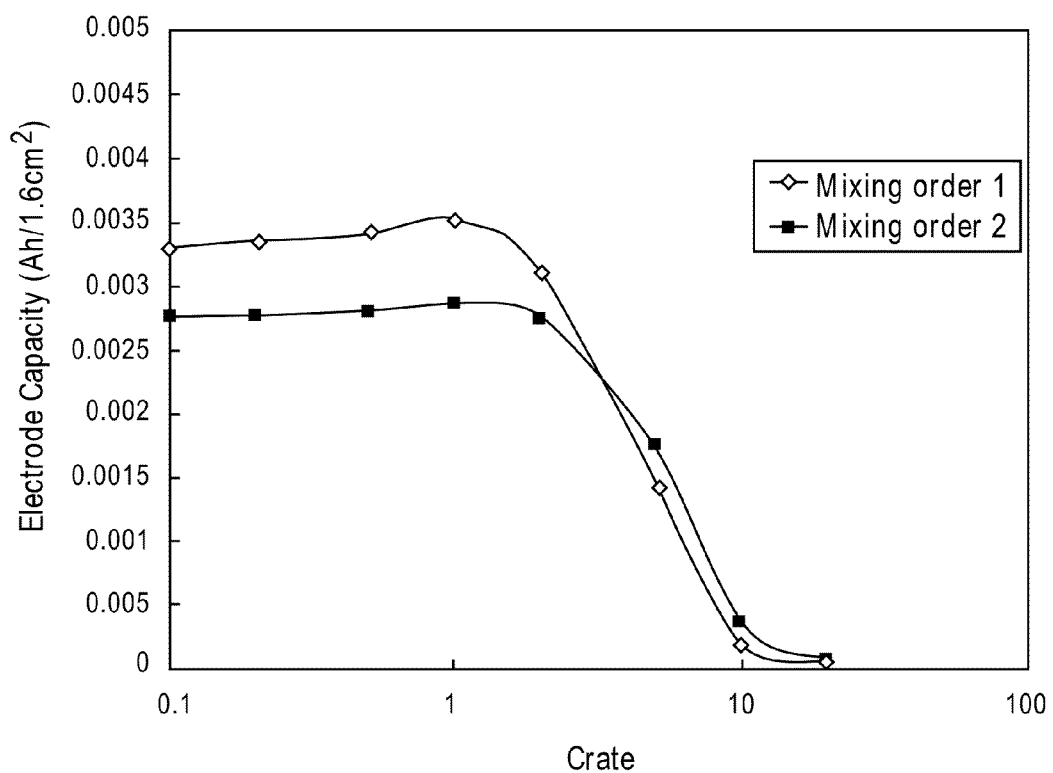
FIG. 8 is a plot rate performance of a CCP-G8 flake graphite anode (commercially available from Conoco Phillips) obtained via mixing sequences 1 and 2.
Figure 9:
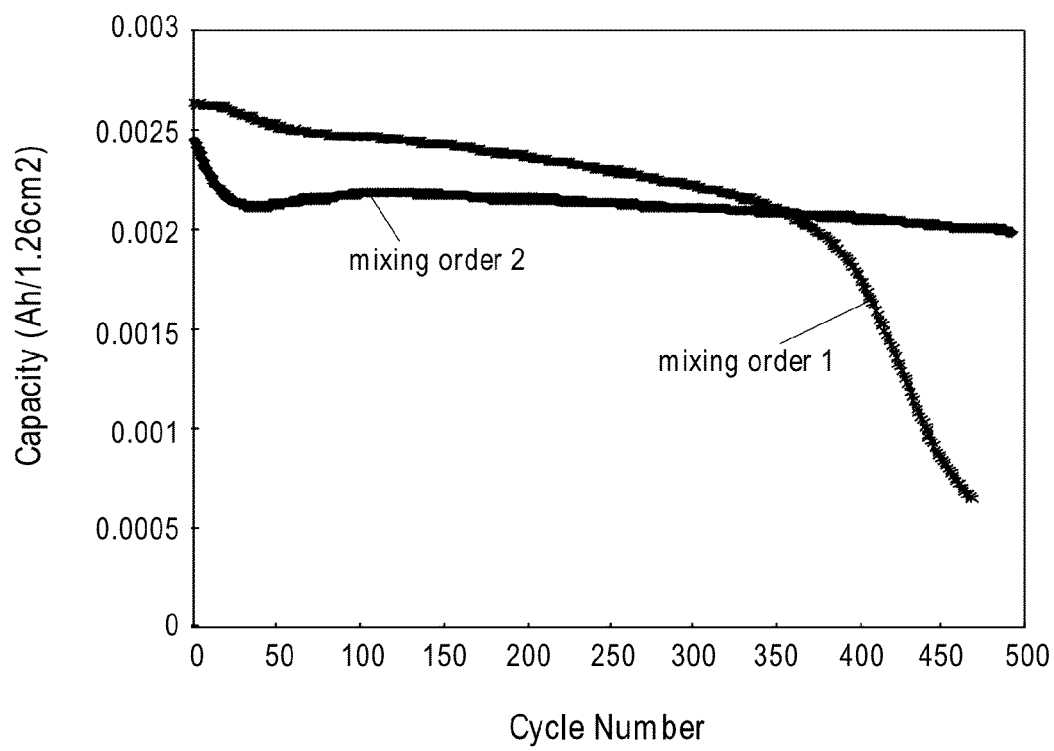
FIG. 9 is a plot of the cycling behavior of full cells employing the CCP-G8 flake graphite containing anode of FIG. 8 prepared using different mixing orders in combination with an L333 ($LiNi_{1/3}CO_{1/3}Mn_{1/3}O_2$) active material containing cathode, the commercially purchased cathode used as a standard.

Comparing the mixing order effect on the rate capability of CCP-G8 graphite material, the results are plotted in FIG. 8. As can be seen from the plot, no major difference in rate performance of the laminate was observed, indicating that mixing order does not significantly influence rate performance of the graphite anode.

However, when full cells were made with the same CCP-G8 electrodes of FIG. 8 combined with an L333 ($LiNi_{1/3}CO_{1/3}Mn_{1/3}O_2$) containing cathode, long term performance was greatly enhanced. Cycling behavior of these full cells is plotted in FIG. 9. Illustrated is that the anode laminate prepared according to the second sequential method exhibited substantially better cycling behavior. No significant capacity fade was observed after 500 cycles. However, for the laminate made with a material prepared according to the first mixing order (i.e. sequence), the full cell went dead after 400 cycles.

To explain these differences in cycling performance, mechanical properties of the laminates were tested. For the CCP-G8 graphite anode, the tensile strength of the laminates made using slurries prepared according to the first or second sequence were similar. However, when Young's modulus was measured, the results were quite different, with the laminates prepared using the second mixing order having a much lower Young's modulus, which would indicate that this more elastic material is much better able to accommodate the stains and stresses of the electrochemical cycles.

Figure 10A:
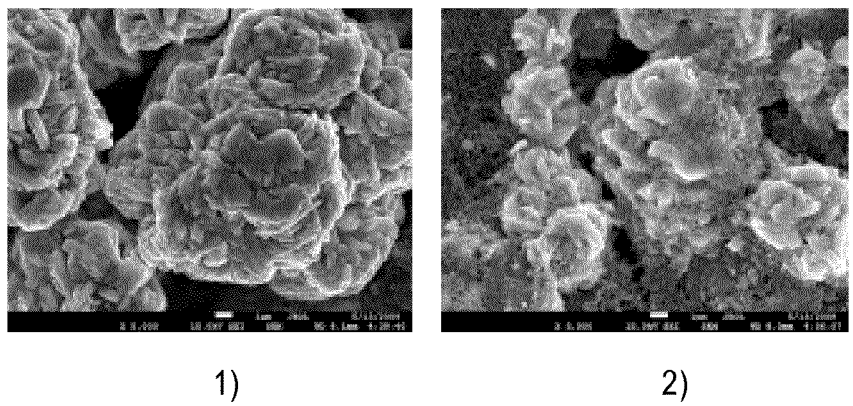
FIG. 10 are SEM images of the L333 cathode laminate prepared using different mixing orders.
Figure 10B:
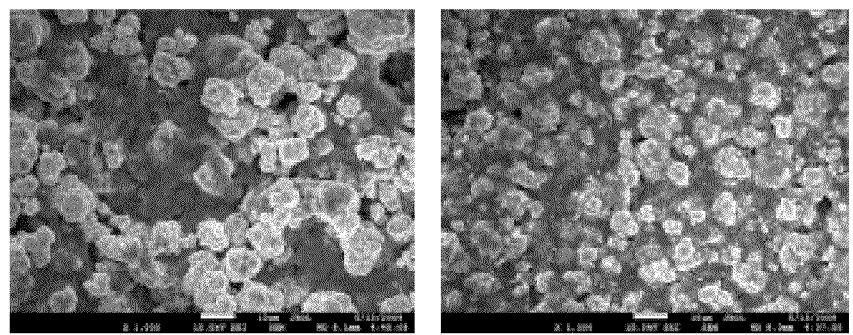

Similar testing for the L333 cathode laminates was also conducted. Considering first the morphologies of the laminates, as shown in FIG. 10, from the SEM images observed, it appears the second order of mixing (mixing sequence 2) makes the distribution of acetylene black more uniform and in closer contact with the active material particles. With the first order of mixing (mixing sequence 1), acetylene black is not distributed evenly within the laminate. In comparing mechanical properties of the L333 cathode laminate, following mixing sequence 2, both tensile strength and Young's modulus were significantly higher than that for the same graphite laminate prepared using the mixture prepared according to the first mixing sequence.

Figure 11:
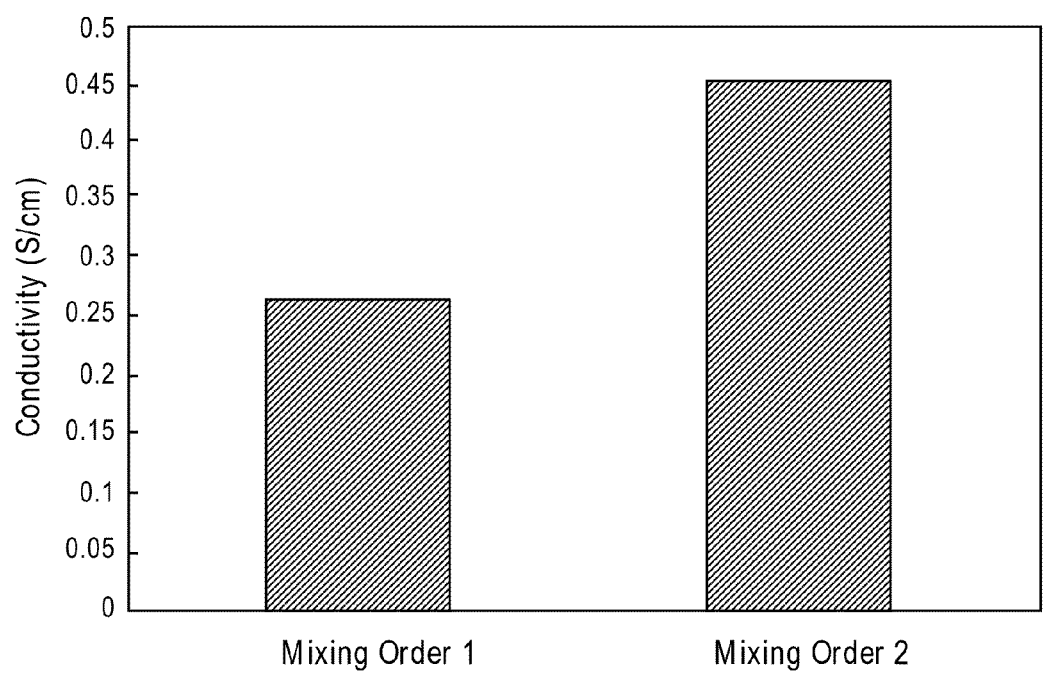
FIG. 11 is a graph comparing the conductivity value of the L333 cathode laminate prepared using the slurry of mixing sequence 1 vs. mixing sequence 2.

Conductivity measurements plotted in FIG. 11 indicate the conductivity of the L333 cathode laminate is influenced by the mixing order of the slurry. As illustrated, with the second mixing order the laminate has a higher conductivity value than that obtained according to the first mixing order. The reason, most likely, is due to the uniform distribution of acetylene black within the electrode as shown in FIG. 10.

Figure 12:
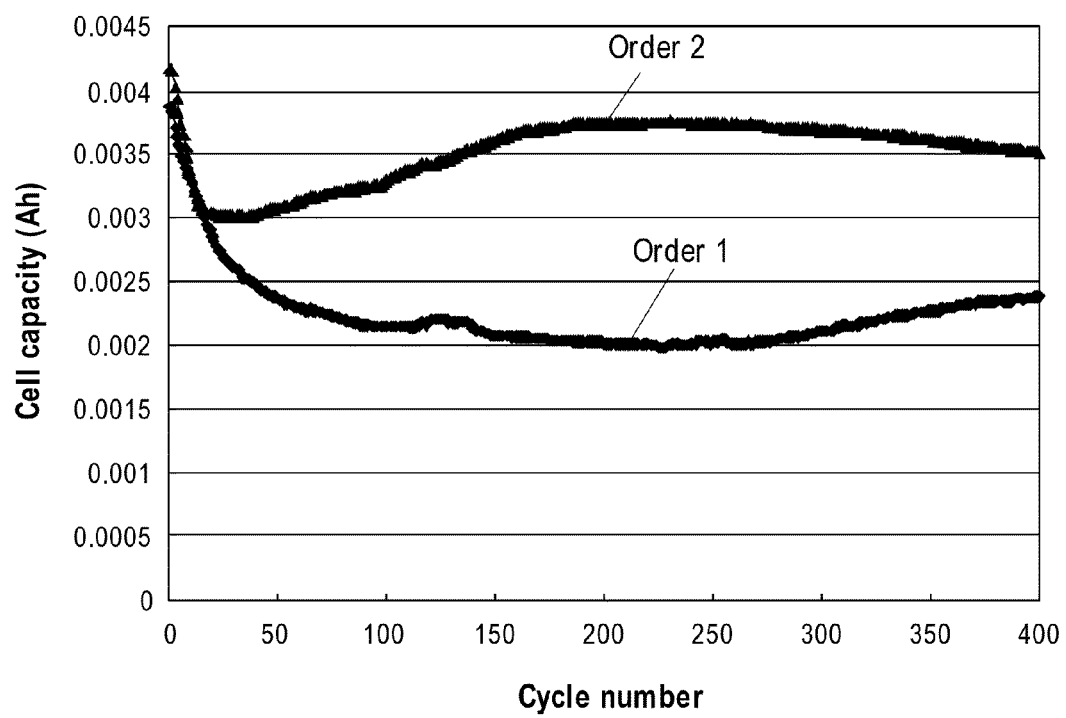
FIG. 12 is a plot of cycling behavior of full cells employing a CCP-G8 anode prepared according to mixing sequence 2, and an L333 cathode prepared using mixing sequences 1 and 2.

Rate capability of the L333 cathode laminate prepared according to the different mixing orders was also compared, with no significant differences in rate performance observed. However, when full cells were made with the CCP-G8 electrode, as shown in FIG. 12, overall cycling performance was improved, with cell capacity remaining higher at all cycles for the full cells prepared using the second sequencing method of preparation.

OTHER EXAMPLES

Example 1

Fabrication of Gen2 Lithium Ion Pouch Cells Utilizing Mixing Sequence 1

The following is exemplary of general procedures useful for fabricating electrodes and pouch cell batteries based on Gen2 cathode material $LiNi_{0.8}CO_{0.15}Al_{0.05}O_2$ and Mag10 (graphite) anode material.

I. Cathode

The cathode electrode for Gen2 cell is composed of 84% $LiNi_{0.8}CO_{0.15}Al_{0.05}O_2$ active material, 4% acetylene black, 4% SFG-6 graphite (a second form of conductive additive) and 8% PVDF binder.

1. Slurry

It is found that pre-dispersion of acetylene black can be important for achieving a homogenous mixture, and low contact resistance for the laminate. Pre-dispersion is done by mixing 3 g of acetylene black with 50 mL of acetone and ten drops of Triton 100. This mixture is then ultrasonicated at 60% amplitude for 5 minutes in a Branson 450 sonifier. The mixture is then emerged in ice water to disperse the heat generated during sonication. The mixture is then concentrated using rotary evaporator at a reduced pressure into a chunk of solid. This solid is collected as dispersible carbon black for making the electrode.

To create the slurry, 0.38 g of the dispersible carbon black is mixed with 5.27 g of NMP solvent, and sonically dispersed for 5 minutes before 6.3 g of PVDF (KF1320, 12%) cathode binder is added. The mixture is stirred with a Hohsen slurry blender for 2 hours at 500 RPM at ambient condition. After which, 0.38 g of SFG-6 graphite and 7.9 g $LiNi_{0.8}CO_{0.15}Al_{0.05}O_2$ active material are added, and stirred for an additional 3 hours at ambient condition. During the last 10 minutes of stirring, a vacuum was applied.

2. Casting Cathode

In preparation for casting the electrode, a doctor blade set a 150 micron high and the draw down coater casting speed is set at 5. Al foil (the cathode current collector) 30 micron thick is tightly laid onto the coating machine and held by vacuum.

Immediately after stopping the stirring and vacuum of the slurry, the slurry is poured to the doctor blade holder and spread out across the blade. The casting is started at a constant speed of 5. After the casting arm has stopped, an IR lamp (250 W) is turned on for 1 hour to bake out the NMP solvent. The laminate is dried at 150° C. for an additional 6 hours under high vacuum.

3. Calendering

The laminate is cut into 3 cm by 4 cm electrode with a 1 cm by 0.5 cm tab on the upper right side of the electrode. The electrode material on the tab region is scraped away with a flat head knife and may further be cleaned with hot NMP. Each electrode is weighed and the thickness is measured on all four quandaries. The average thickness of the electrode with Al current collector is 75 micron. The electrode has 5.58 $mg/cm^2$ of active material loaded, has a capacity of 0.948 $mAh/cm^2$, and a porosity (as cast) of 49%.

The target porosity thickness including the Al current collector is 40% which is about 47-50 microns. The calendering machine is set to 150° C. for pressing. The electrode is sandwiched between two pieces of Al foils to prevent contamination of the rollers. The distance between the rollers is adjusted to the desired thickness with the consideration of the additional thickness attributable to the Al foils. The rolling speed is set a t low speed region of 2. The electrodes are fed through the two rollers one or more times until the desired thickness (50-58 micron) is achieved.

II. Anode

The anode electrode for the Gen2 cell is composed of 90% Mag10 graphite active material (commercially available from Hitachi) and 10% PVDF binder.

1. Slurry

To create the slurry, 5 g of the Mag10 powder is mixed with 4.3 g of PVDF (KF9130, 13%) anode binder and 10 g of NMP solvent. This mixture was stirred with a Hohsen slurry blender for 3 hours at 500 RPM at ambient condition. During the last 10 minutes of stirring, a vacuum was applied. In this particular fabrication sequence, conductive carbon was not included in the electrode mixture. Nonetheless, the overall approach remains illustrative of battery fabrication techniques suitable for use with this invention.

2. Casting Anode

In preparation for casting the electrode, a doctor blade set a 160 micron high and the draw down coater casting speed is set at 5. Cu foil (the anode current collector) 28 micron thick is tightly laid onto the coating machine and held by vacuum.

Immediately after stopping the stirring and vacuum of the slurry, the slurry is poured to the doctor blade holder and spread out across the blade. The casting is started at a constant speed of 5. After the casting arm has stopped, an IR lamp (250 W) is turned on for 1 hour to bake out the NMP solvent. The laminate is dried at 150° C. for an additional 6 hours under high vacuum.

3. Calendering

The laminate is cut into 3.15 cm by 4.15 cm electrode with a 1 cm by 0.5 cm tab on the upper left side of the electrode. The electrode material on the tab region is scraped away with a flat head knife and may further be cleaned with hot NMP. Each electrode is weighed and the thickness is measured on all four quandaries. The average thickness of the electrode with Cu current collector is 83 micron. The electrode has 3.17 $mg/cm^2$ of active material loaded, has a capacity of 1.14 $mAh/cm^2$, and a porosity (as cast) of 76%.

The target density of the anode including the Cu current collector is 1 $g/cm^3$ which is about 56 micron. The calendering machine is set to 150° C. for pressing. The electrode is sandwiched between two pieces of Al foils to prevent contamination of the rollers. The distance between the rollers is adjusted to the desired thickness with the consideration of the additional thickness attributable to the Al foils. The rolling speed is set a t low speed region of 2. The electrodes are fed through the two rollers one or more times until the desired thickness (50-57 micron) is achieved.

III. Tab Lead Welding

An Al tab is used for the cathode and a Ni tab is used for the anode. A piece of thermal plastic glue is attached to each of the tab leads for better adhesion between the pouch and the tab lead. The Al tab lead was ultrasonically welded onto the Al current collector. The cathode edge to the plastic glues has a 2 cm distance.

IV. Electrode Backing

An electrode backing may not be necessary for an electrode coated on only one side, but is required for electrodes coated on both sides.

The purpose of introducing an electrode backing is to improve the strength of the electrode, and thus making it less likely to sustain damage during cell assembly. The electrode backing laminate is cut the exact same size and shape as the electrode, and laminated on the back of the electrode. If the electrode is double size coated, the laminated film will effectively isolate one side form electrochemical reaction.

GBC® Docuseal pouch and laminator are used for the electrode backing. The laminate material is made of polypropylene (or polyethylene) glue layer and polyethylene terephthalate (or nylon) backing layer. The laminator temperature is set at 150° C. to 200° C.

V. Electrode Assembly

A separator, such as a 25 μm thick porous polypropylene, is cut into 3.5 cm by 4.5 cm area. The cathode, separator, anode are stacked together. The separator is placed with all four edges coming out of the electrode. Since the anode is slightly larger than the cathode, the anode should cover all four edges of the cathode electrode. The electrode assembly is taped together with high vacuum tap on two opposite sides to fix the electrodes and separators in place.

VI. Pouch Cell Assembly

The edge of the pouch cell sealer is insulted by silicon rubber. The silicon rubber provides a soft contact with the pouch for better sealing performance. The sealer is pre-heated to 200° C.

The electrode feed through needs to be positioned carefully and sealed into place. The other two edges of the pouch are also sealed, which leaves only one side open for electrolyte filling. The sealer is completely compressed for 30 seconds for each sealing to achieve a complete seal.

The pouch cell assembly is dried at 70° C. for 24 hours before it is transferred into a glove box. Inside the glove box, 0.25 mL of electrolyte is added between the cathode (or anode) and separator. Before the cell is completely sealed, the electrolyte is allowed to permeate throughout the entire electrode assembly for 2 to 5 minutes. A needle attached to a vacuum line is introduced into the pouch. A low vacuum is applied to flatten the cell. The pouch is resealed under vacuum condition.

The pouch is placed onto a fixture and 10 psi pressure is applied. The cell went through a formation cycle for 30 hours at ambient condition. After formation has completed, the pouch is cut open and 0.2 mL of electrolyte is injected between the cathode (or anode) and separator, and vacuum resealed.

Example 2

Fabrication of $LiMn_2O_4$ (Spinel)/Graphite-Based Lithium Ion Pouch Cells Utilizing Mixing Sequence 1

The following exemplary procedures are useful for making electrodes and batteries of $LiMn_2O_4$ (spinel) and MCMB (meso carbon micro beads) graphite for high-power applications (HEVs) utilizing mixing sequence 1. Electrode performance can be very dependent on the materials used so it is pointed out that Toda M809 ($LiMn_2O_4$) was used for the cathode active material and MCMB 10-28 from Osaka Gas was used for the anode active material. The conductive additives were Dankon™ black, an acetylene black, and SFG-6, a micron-size graphite. The binder used is PVDF (Kureha 1100).

I. Cathode

1. Slurry for Both Electrodes

This slurry making procedure is optimized for both the spinel cathode material Toda M809 and the MCMB10-28 anode material.

The cathode electrode for a spinel cell is composed of 81.6% $LiMn_2O_4$ active material (Toda M809), 6.4% acetylene black (Dankon™), 4% SFG-6 graphite (a second form of conductive additive commercially available from Timcal Ltd., and 8% PVDF binder (Kureha #1100).

The binder solution is a 5% wt. PVDF (Kureha #1100) in NMP solution which is made and stored in the glove box. The PVDF is dried at 120° C. under high vacuum for about 12 hours prior to mixing. Bio-grade anhydrous NMP solution is available from Sigma-Aldrich.

The conductive carbon black is Dankon™ black and is dried at 190° C. under high-vacuum for 24-hours prior to use. An appropriate amount of the carbon black is mixed with the binder solution to make a carbon black to PVDF weight ratio of 4:5. The mixture is sonicated for 30-minutes at 70% power using a Branson 450 Sonicator to improve the carbon black dispersion. The process is performed in a glove box.

To create the slurry, 20.36 g of the conductive glue is mixed with 10 g $LiMn_2O_4$ and 0.49 g SFG-6. The mixture is homogenized using Polytron PT10-3S Homogenizer at 3000-5000 RPM for 5 minutes until a viscous slurry is acquired. This process is performed in a glove box.

2. Casting the Cathode Electrode

A Mitutoyo doctor blade is set at a height of 250 μm for casting; the draw down coater (manufacturer: Yoshimitsu Seiki; Model: YOA-B) casting speed is set at 5. (The ratio of the height of the blade and the final electrode thickness (in dry state) is set ca. 3:1 of the final target thickness.) Trace NMP solvent is spread on the perforated glass table top of the casting machine before Al foil (28 μm thick) is spread across the top. The Al foil is then tightly held to the glass by vacuum and the trace NMP. Trace NMP is also spread on the surface of the Al foil to improve the wettability of the slurry with Al foil. The trace NMP on the Al surface is allowed to evaporate before casting an electrode.

Improving the adhesion of the laminate to the Al or Cu foil, thereby reducing the electrode resistance, may be made by roughening the foil surface after it has been placed on the coater surface with memory cloth and then cleaning the surface with NMP solvent. The roughening may remove the oxidation film on the Al/Cu foil and increase the contact area of active material with the current collector.

The slurry (12 ml) is poured adjacent to the doctor blade holder and spread out across the blade; the casting is started at a constant speed of 5. After the casting arm has stopped, the IR lamps at 250 W are turned on for an hour to bake out the NMP solvent. The laminate is then dried at 120° C. for an additional 12 hours under high-vacuum. This process is performed in the glove box and the antechamber affixed to the glove box.

A portion of the cathode electrode is weighed and the total weight, including current collector, is recorded. It should be ca. 20 mg/cm$^2$, which translates to 0.94 mAh/cm$^2$ based on the density of the aluminum foil, the formulation proposed, and the manufacturer's reported a 1st charge capacity of 90 mAh/g, 1st discharge capacity of 89 mAh/g, and efficiency of 98.3%. A Swagelok cell with electrode area of 1.27 cm$^2$, with lithium as counter and reference electrodes, is assembled to test the capacity of the electrode. LP40 electrolyte from Ferro, America is used. The initial capacity test is performed at C/25 charge and discharge current densities based on the capacity calculated above. The first charge capacity we find for this material is 0.97 in Ah/cm$^2$, and the first discharge capacity is 0.90 mAh/cm$^2$. This translates to a first cycle efficiency of 92%. The Swagelok cell is assembled in a glove box and tested at ambient conditions.

3. Calendering

Once satisfied with the capacity of the laminate, it is cut into 3 cm by 4 cm rectangles with a 1 cm by 0.5 cm tab on the upper right side of the electrode with a punch (Custom built punches by Lanval Poinçons et Matrices Ltée in Canada). The electrode material on the tab region is scraped away with a flat head knife, and may further cleaned with hot NMP (5 ml). At this point, each electrode should be weighed and the weight recorded. Warning: use of NMP at this stage should be done with great caution as residual NMP is known to lead to delamination of electrodes.

The target porosity of a spinel-based electrode for an HEV application is 40%. This results in a target thickness of 91 μm, including current collector.

The calendering machine (manufacturer: International Rolling Mills) temperature control is left off. The electrode is sandwiched between two sheets of Al foil to prevent contamination of the rollers. The distance between rollers should be adjusted to the desired thickness, taking into account the thickness of the two aluminum sheets. The rolling speed is sit at a low speed 2. The electrodes are fed through the rollers two or three times until the desired thickness is achieved.

Each electrode should be measured for thickness using a micrometer and weighed again with the total capacity calculated and recorded.

II. Anode

The procedures for making anode laminates are similar to those for the cathode above. Differences are spelled out below.

1. Slurry

The anode electrode for the spinel cell is composed of 92% MCMB10-28 graphite active material, 8% of PVDF binder (Kureha 1100). MCMB is a gift from Osaka Gas, Japan. 7.8 g of the MCMB10-28 powder is mixed with 13.5 g PVDF (Kureha 1100, 5%) binder solution. The mixture is homogenized at 3000-5000 RPM for 5 minutes. This process is performed in a glove box. In this exemplary embodiment, while conductive carbon was not added to the anode mixture, the overall process, however, remains illustrative of battery fabrication techniques suitable for use with the invention.

2. Casting Electrode

A doctor blade set at 150 μm high for casting, drawdown coater casting speed set at 5. Trace NMP solvent is spread on the glass surface of the coater table top before Cu foil (less than 30 μm thick, or preferably about 15 μm thick) is spread across it. The Cu foil is tightly held down by applying the vacuum in the presence of the NMP. Trace NMP solvent is also spread on the Cu foil surface to improve the wettability of the slurry. The trace NMP is evaporated before casting.

The height of the doctor blade in relation to the final electrode thickness (in dry state) is set at a height of ca. 2:1. Immediately after stopping the homogenization, the slurry (12 ml) is spread out across the blade, and the casting stared at a constant speed of 5. After the casting arm stops, the IR lamps (250 W) are turned on for an hour to bake out the NMP solvent. The laminate is dried at 120° C. for an additional 12 hours under high vacuum. This process is done in a glove box and the antechamber affixed to the glove box.

The electrode is weighed and the total weight including current collector is recorded. It should be ca. 38.1 mg/cm$^2$. The manufacturer of MCMB (Osaka Gas, Japan) does not provide a specific capacity or other electrochemical test data for this material. A Swagelok cell with electrode area of 1.27 cm$^2$, lithium as counter and reference electrodes, is assembled to assess the capacity of the electrode. LP40 electrolyte from Ferro, Japan is used. The first charge capacity is measured at 340 mAh/g and the first charge capacity is 277 mAh/g. The irreversible capacity is 23%. The cell is assembled in a glove box and tested at ambient conditions.

3. Calendering

The laminate is cut into 3.15 cm by 4.15 cm rectangle with a 1 cm by 0.5 cm tab on the upper right side of the electrode. This procedure is carried out with a custom punch. The electrode material on the tab is scraped away with a flat-head knife, and may further be cleaned with hot NMP. At this point, each electrode should be weighed and the weight recorded. This process is performed in a glove box.

The anode thickness is targeted such that the void volume is 40%. This should result in an electrode of 61 microns, including Cu current collector.

The temperature of the calendering machine is left at ambient conditions for pressing. The electrode is sandwiched between two sheets of Al foil to prevent contamination of the rollers. The distance between the rollers is adjusted to the desired thickness with consideration of the additional thickness contributed by the Al sheets. The rolling speed is sit at a low speed of 2. The electrodes are fed through the two rollers two or three times until the desired thickness is achieved. This process is performed in a glove box.

Each electrode is weighed again, and the weight recorded, total capacity calculated, and the thickness measured with a micrometer.

III. Tab Lead Welding

An Al tab is used for the cathode and a Ni tab for anode. The tab lead is manufactured by Showa, Japan. A piece of thermoplastic glue is attached to each of the tab leads by the manufacturer for better adhesion between the pouch and the lead. The Al tab lead is ultrasonically welded to the Al current collector such that the lower edge of the plastic glue is 2 cm from the top edge of the electrode. This process is performed in a glove box.

IV. Electrode Assembly

The electrodes are dried at high-vacuum at 60° C. for 12 hours. A separator is cut into a 3.5 cm by 4.5 cm rectangle and dried under high-vacuum at room temperature for the same amount of time. Cathode, separator, and anode are stacked one upon the other with the laminates facing each other through the separator. The separator is positioned such that all four sides stick out. Since the anode is slightly larger than the cathode, the anode should over lap all four edges of the cathode. A 3.5 cm by 4.5 cm by 2 mm thick PTFE sheet is set behind the anode electrode to provide mechanical strength for the cell. This process is performed in a glove box.

V. Pouch Cell Assembly

A Fuji vacuum sealer is used to seal the pouch cells. The electrode feed through needs to be sealed in place first. The opposite edge of the pouch is then sealed. Only one side is left open for electrolyte filling. The sealer is pressed all the way down for 10 to 30 seconds for each sealing. 0.25 mL of electrolyte is added between the cathode, anode, and separator. Two to five minutes are allowed to pass for the electrolyte to permeate throughout the entire electrode assembly before the cell is completely sealed under vacuum.

The pouch cell is put in a test fixture and 10 psi pressure applied. The cell is put through formation cycles at 30° C. in an oven. After the formation is finished, the pouch is cut open, cell degassed under vacuum of the cell sealer and the cell re-sealed. The cell is transferred out of the glove box for EV and HEV testing.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

We claim:

1. A lithium ion battery comprising:
   a) A first mixture comprising a carbon conductor, a binder, NMP, and a lithium oxide active material, a second mixture comprising the carbon conductor, the binder, NMP, and a graphite active material, wherein the weight ratio of carbon conductor to binder of the first mixture and the second mixture are less than 0.6 to 1;
   b) a cathode conductive material coated by the first mixture;
   c) an anode conductive material coated by the second mixture;
   d) an electrolyte; and
   e) a cell housing;
      wherein the cathode, anode and electrolyte are assembled into the cell housing with a porous separator disposed between the cathode and anode.

2. The lithium ion battery of claim 1, wherein the carbon conductor is selected from the group consisting of one or more of the following: acetylene black, carbon fibers, single wall carbon nanotubes, and multiwall carbon nanotubes.

3. The lithium ion battery of claim 1, wherein the binder is selected from the group consisting of one or more of the following: PVDF, PTFE, and latex.

4. The lithium ion battery of claim 1 wherein the cathode conductive material comprises aluminum.

5. The lithium ion battery of claim 1, wherein the anode conductive material comprises copper.

6. The lithium ion battery of claim 1, wherein the cathode and anode conductive material are in the form of a foil or sheet.

* * * * *